United States Patent [19]

Hakansson

[11] Patent Number: 5,439,094
[45] Date of Patent: Aug. 8, 1995

[54] APPARATUS FOR GROUPING OBJECTS

[75] Inventor: Jan Hakansson, Eslöv, Sweden

[73] Assignee: Tetra Laval Holdings & Finance SA, Pully, Switzerland

[21] Appl. No.: 120,080

[22] Filed: Sep. 13, 1993

[30] Foreign Application Priority Data

Sep. 15, 1992 [SE] Sweden .................................. 9202647

[51] Int. Cl.⁶ ............................................. B65G 47/26
[52] U.S. Cl. ................................. 198/419.1; 198/436
[58] Field of Search ...................... 198/418.5, 427, 436, 198/437, 442, 419.1, 440, 441

[56] References Cited

U.S. PATENT DOCUMENTS

| | | | |
|---|---|---|---|
| 2,176,485 | 10/1939 | Bronander | 198/437 |
| 3,311,217 | 3/1967 | Muhlenbruch | 198/436 |
| 3,357,537 | 12/1967 | Ring . | |
| 3,388,815 | 6/1968 | Lingl | 198/436 |
| 3,469,673 | 9/1969 | Gentry | 198/440 |
| 3,771,648 | 11/1973 | Revuelta | 198/440 |
| 3,795,302 | 3/1974 | Schopee . | |
| 3,854,569 | 12/1974 | Steinhart et al. . | |
| 4,029,198 | 6/1977 | Lingl | 198/419.1 |
| 4,244,461 | 1/1981 | Fischer et al. . | |
| 4,258,532 | 3/1981 | Dilot . | |
| 4,283,245 | 8/1981 | Benoit | 198/436 |
| 5,174,430 | 12/1992 | Ebira | 198/419.1 |
| 5,186,306 | 2/1993 | Sjostrand . | |

FOREIGN PATENT DOCUMENTS

| | | |
|---|---|---|
| 0480436 | 4/1992 | European Pat. Off. . |
| 134368 | 6/1976 | Norway . |
| 8900869 | 9/1990 | Sweden . |

OTHER PUBLICATIONS

Derwent's Abstract Nr. 86-344 860/52, SU 1 227 553, publ. week 8652.

Primary Examiner—Joseph E. Valenza
Attorney, Agent, or Firm—Burns, Doane, Swecker & Mathis

[57] ABSTRACT

The invention relates to an apparatus for grouping objects in which objects on an ingoing conveyor are released in preselected numbers by a brake. The preselected number of objects pass one or two pushers which are arranged such that they execute a movement that is both transverse relative to the direction of an outgoing conveyor and synchronous with the outgoing conveyor. Where two pushers are used, they move in sequence so that a first pusher groups objects first, followed by the second pusher, and then both pushers remain in their position of rest, and the objects are grouped in three different rows on the outgoing conveyor.

23 Claims, 4 Drawing Sheets

APPARATUS FOR GROUPING OBJECTS

TECHNICAL FIELD

The present invention relates to an apparatus for grouping objects, comprising an ingoing conveyor entering the apparatus, with a brake which releases the objects in a preselected number, a carrier or pusher and at least one outgoing conveyor departing from the apparatus.

BACKGROUND ART

In the manufacture and handling of objects, it is often desirable to group such objects so as to be able to more readily handle them and pack them in suitable multipacks. This also applies to disposable packages or cartons for foods such as, for instance, milk or juice. When the packages depart from the filling machine on a conveyor, it is often desirable to combine the packages into larger units in order to be able to more readily handle them on distribution. Such combination into and packaging in larger units is normally carried out at the dairy or in the juice factory and the distribution units may consist of trays of cardboard or plastics, but may also be different types of shrink-film wrapped groups.

Each type of machine for combining into different distribution units normally features its own type of grouping apparatus. This grouping apparatus normally consists of a carrier or so-called pusher which brings together a number of packages to form a group. This system entails that the ingoing transport of packages must be arrested in order to allow the pusher to have time to execute its grouping operation. There are also types of rotary pushers, as described in Swedish Patent Application No. 8900869-2. Most of these grouping operations entail, however, that output capacity must be reduced in order for the pusher to have time to carry out the grouping operation. Furthermore, these prior art solutions entail that each distribution machine must be provided with a grouping unit specifically adapted to the purpose.

OBJECTS OF THE INVENTION

One object of the present invention is to provide a grouping apparatus which is rapid and reliable and which may group objects, such as the packages, together without ingoing transport of the packages being stopped. Further, the apparatus according to the invention should be so flexible that the same grouping apparatus can be employed for different types of distribution machines, such as shrink-film wrappers or tray packers.

SUMMARY OF THE INVENTION

These and other objects have been attained according to the present invention in that an apparatus of the type described by way of introduction move, on the one hand, transversely in relation to the conveyor device of the outgoing conveyor and, on the other hand, such that the contact surface of the pusher moves synchronously with the transport device.

Preferred embodiments of the present invention have further been given the characterizing features as set forth in the appended subclaims.

BRIEF DESCRIPTION OF THE ACCOMPANYING DRAWINGS

The features and advantages of the present invention will be well understood by reading the following detailed description in conjunction with the drawings in which like numerals indicate similar elements and in which:

FIG. 5 is a perspective view of the apparatus according to an embodiment of the invention including a brake that raises objects from the ingoing conveyor.

DETAILED DESCRIPTION

Figure 1:
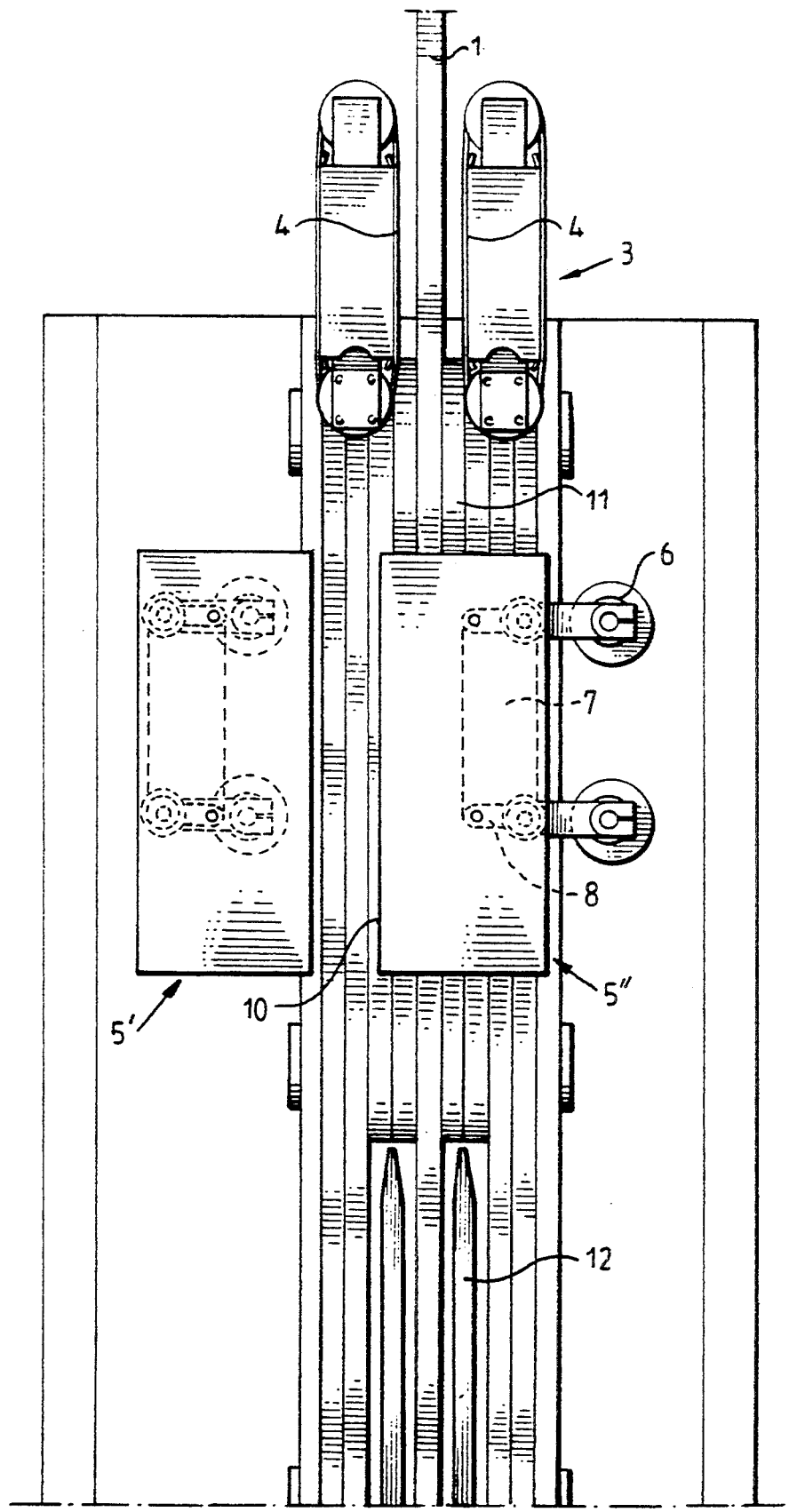
FIG. 1 is a plan view of the apparatus according to an embodiment of the invention with two pushers.
Figure 2:
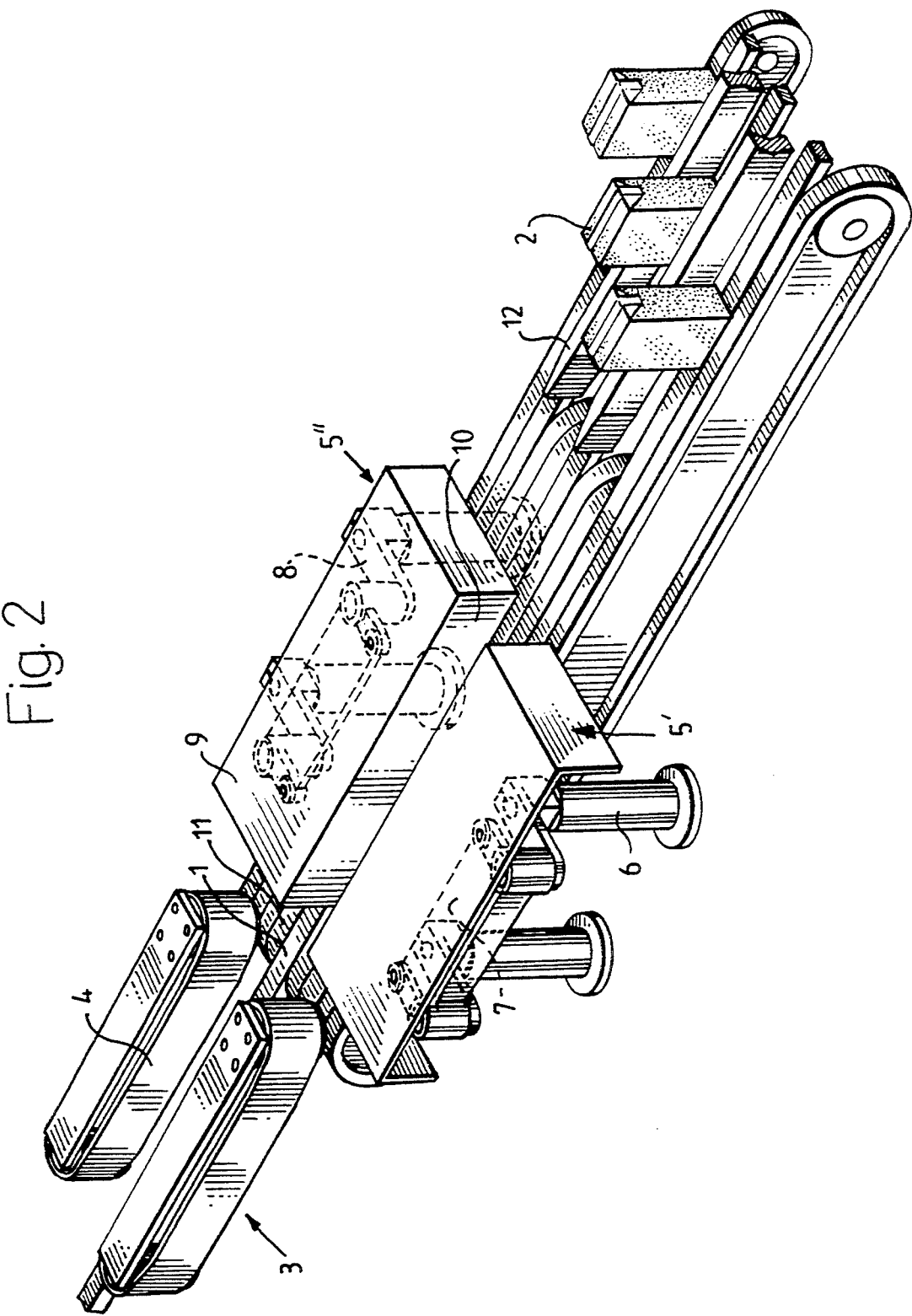
FIG. 2 is a perspective view of the apparatus according to an embodiment of the invention with two pushers.

The apparatus according to the invention, as shown in FIGS. 1 and 2, comprises a conventional ingoing conveyor 1 into the apparatus. The conveyor I has a conveyor device which may consist of an endless belt or a chain. The conveyor 1 is driven by, for instance, an electric motor (not shown). The ingoing conveyor 1 feeds in the objects 2, the packages, into the apparatus from, for example, a filling machine.

A brake 3 of conventional type is disposed at that point where the objects 2 depart from the ingoing conveyor 1. The brake may, for example, be of the belt brake type in which belts move in towards the objects and fixedly restrain them in that one belt 4 clamps the objects from either side. The brake 3 retains the objects 2 so that they slip against the ingoing conveyor 1, but may also be a brake 3 of the type which lifts the objects 2 from the conveyor device of the ingoing conveyor 1 as seen in FIG. 5. The brake 3 is programmed such that it releases the objects 2 in a preselected number and allows them to pass further into the apparatus.

Figure 3:
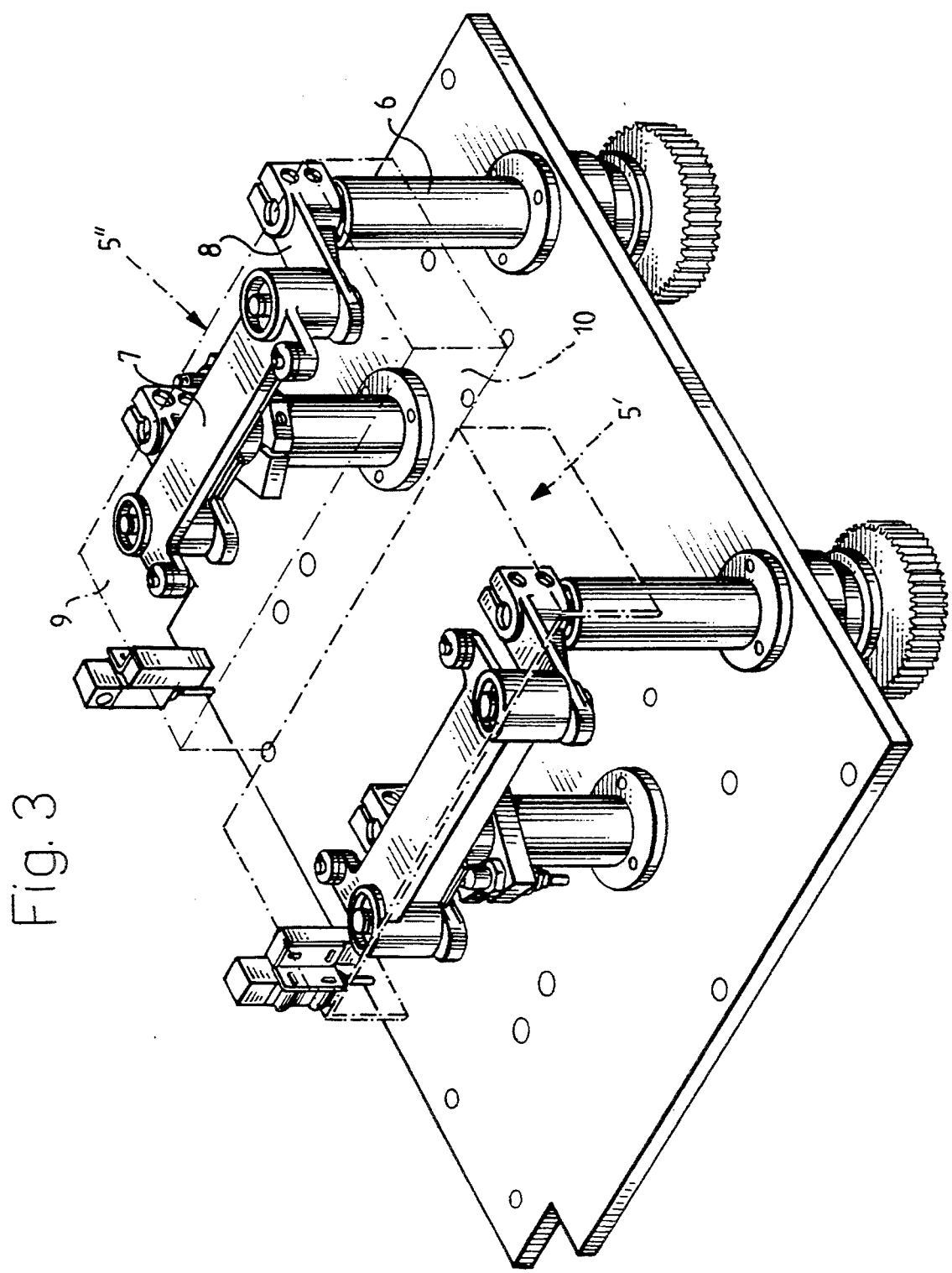
FIG. 3 is a perspective view of two pushers according to an embodiment of the invention.

Next in the direction of transport of the objects 2, there is disposed at least one—but in the preferred embodiment two—carriers 5 of the so-called "pusher" type. As seen with reference to FIGS. 1, 2, and 3, the pusher 5 is secured by horizontal shafts at two points, the shafts 6 being mechanically interconnected with one another by the intermediary of a connector plate 7. Between the horizontal shafts 6 and the connector plate 7, there are two arms 8, which entails that, the cyclic movement of the pusher 5 will be elliptical. The pusher 5 is electrically driven, either directly or via a cogged belt. On the connector plate 7, there is secured a pusher plate 9 which, at least on one face, is bent down to a contact surface 10 acting against the objects 2. The width of the contact surface 10 must at least correspond to the width of that number of objects 2 which is to be displaced in one and the same work cycle, i.e., the number of objects 2 preselected by the brake 3.

Thus, the pusher 5 executes a movement which, on the one hand, is transverse in relation to the conveyor device of the conveyor 1 and, on the other hand, such that the contact surface 10 of the pusher 5 moves synchronously with this conveyor device while it displaces the objects 2 advanced ahead of the pusher 5. In order to obtain these two movements, the pusher 5 may also be designed in a more conventional manner, but be provided with a belt which is disposed on the contact surface 10 and which runs synchronously with the conveyor device and advances the objects 2 while the pusher 5 displaces them in the lateral direction.

Once the objects 2 have left the brake 3 in their preselected number, they move out onto an outgoing conveyor 11 of conventional type with an endless belt or a chain driven, for example, by an electric motor. The outgoing conveyor 11 may consist of a single wide conveyor device or, as in the preferred embodiment, a plurality of conveyor devices divided up such that rails 12 may be raised up between them and in such a manner marshal the objects 2 into different pens. The speed of the outgoing conveyor 11 may be the same as that of the ingoing conveyor 1, but in order to ensure a more uniform rate of operation for the apparatus as a whole, it is more advantageous if the outgoing conveyor 11 operates at a slightly slower speed. Furthermore, the ingoing conveyor 1 may continue as one of the outgoing conveyors 11. By dividing up the outgoing conveyor 11 into a plurality of parallel conveyor devices with guide rails 12 upstanding between them, a more flexible apparatus will be obtained. The guide rails 12 may be designed such that they can be depressed down to a level beneath the outgoing conveyor 11, it then becoming possible to convey larger objects 2.

Those objects 2 which are to be grouped (in this specific case packages of the disposable type) arrive on the ingoing conveyor 1 into the apparatus. The objects 2 may come straight from a packaging machine or may have been stored in some form of magazine apparatus. The objects 2 first reach the brake 3 where the two mutually facing brake belts 4 move in towards the objects 2, the packages, and clamp them so that they are retained in this position. Thereafter, the brake 3 releases the packages 2 in a preselected number, for example three, which continue on the outgoing conveyor 11. When the objects 2 pass the pusher or pushers 5, this (or one of them) executes its movement.

In the case which is illustrated in FIGS. 1 and 2, use is made of two pushers 5 disposed on either side of the outgoing conveyor 11. When the packages 2 leave the brake 3, either the one pusher 5′ or the other 5″, or neither of them, may execute its movement. The packages 2 are then moved either to one side of the outgoing conveyor 11 or the other side, or remain in their mid-position. Hence, the movement of the pushers 5 is, on the one hand transverse in relation to the conveyor device of the outgoing conveyor 11, and on the other hand synchronous with the direction of movement of this conveyor device, so that the pushers 5 execute an elliptical movement. In such instance, the pusher 5 displaces the packages 2 without disrupting their advancement on the outgoing conveyor 11. For packages 2 of the parallelepipedic type—which may be relatively tall and slim—this is particularly suitable, since a gentle and reliable displacement in the lateral direction of the packages 2 will then be obtained. The packages 2 need not be arrested in their movement in order to be grouped.

Figure 4:
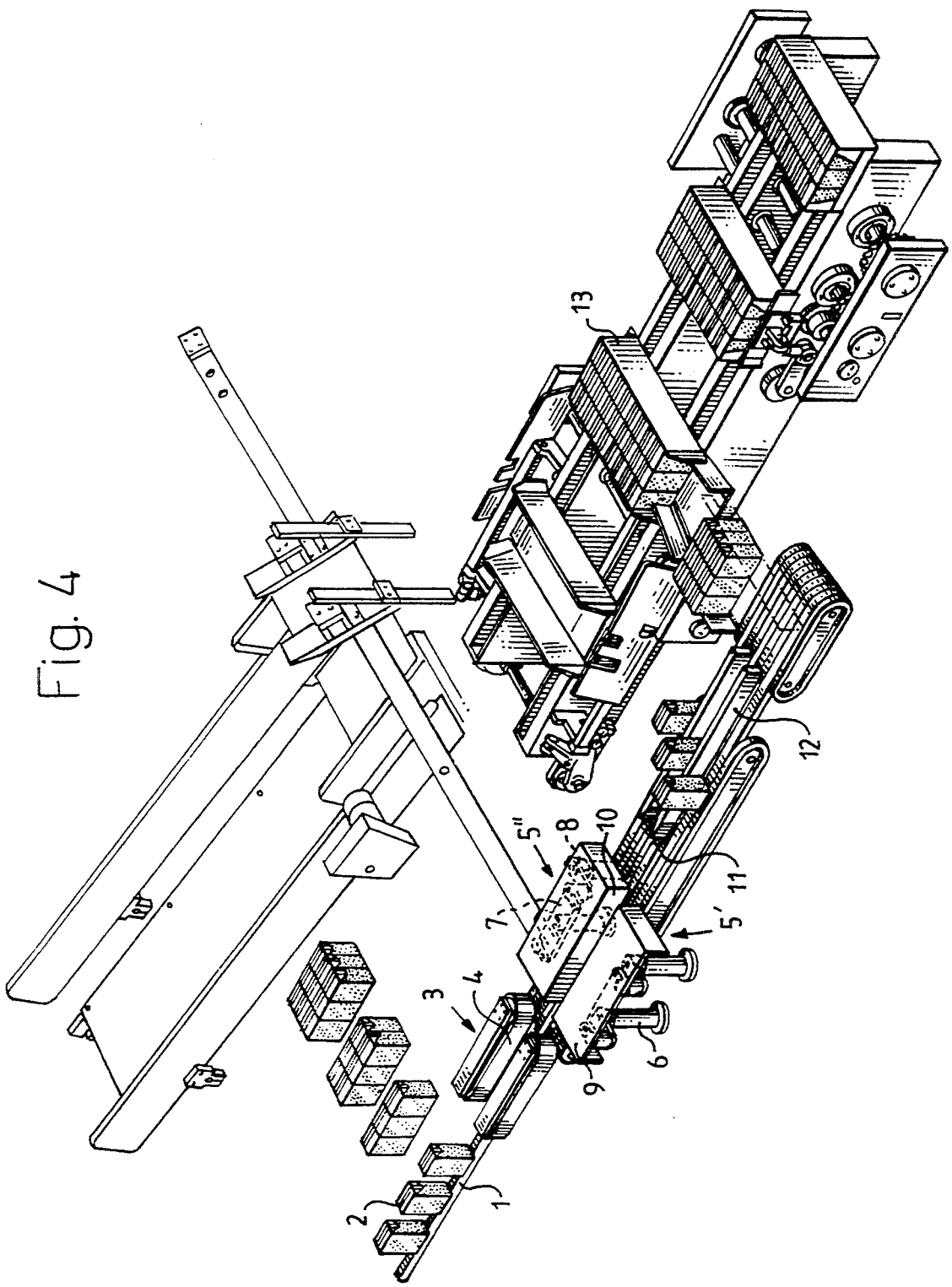
FIG. 4 shows therefor apparatus according to an embodiment of the invention in a distribution machine.

Once the packages 2 have been moved to the one or other side, or have been retained in their mid-position on the outgoing conveyor 11, they are moved via different guide rails 12 into different pens. These pens may, of course, be utilized to distribute the packages 2 onto different conveyor belts. FIG. 4 shows the use of the apparatus including two pushers 5′ and 5″ and the guide rails 12 to group the packages 2 prior to a further packing in a cardboard tray 13 so as to facilitate the distribution of the packages 2.

By leaving the pusher 5 in its outermost position when the contact surface 10 is in contact with the packages 2, it is possible, through the employment of an integrated cylinder and piston assembly (not shown), to extend the movement of the pusher 5 in the lateral direction so that packages can be distributed in a larger number of pens.

That number of packages 2 which is distributed on each stroke of the pusher depends upon the size of the packages 2 which are to be distributed, and the contact surface 10 of the pusher 5 is correspondingly adapted. By varying the width of the contact surface 10 of the pusher 5, a larger or smaller number of packages 2 can be distributed.

As will have been apparent from the foregoing description, the present invention realises a grouping apparatus which is flexible and usable together with different types of distribution equipment. It may further be employed for different package sizes, and by distributing among different numbers of pens, it is possible to obtain an optional grouping or distribution on different outgoing conveyors.

The present invention should not be considered as restricted to that described above and shown on the Drawings, many modifications being conceivable without departing from the spirit and scope of the appended Claims.

What is claimed is:

1. An apparatus for grouping objects, comprising:
a first conveyor for moving objects in a first direction of travel;
a second conveyor for receiving objects from the first conveyor and for moving objects in the first direction of travel; and
pusher means having a contact surface arranged to move objects from a single stream on the first conveyor to multiple streams on the second conveyor in a direction transverse to the first direction of travel of the first conveyor and the second conveyor, the contact surface moving with the objects in the direction of travel as the objects are moved transversely such that advancement of the objects is unimpeded by the contact surface,
wherein the contact surface moves elliptically for its entire path of movement parallel to conveying surfaces of the first and second conveyor means.

2. The apparatus for grouping objects as set forth in claim 1, wherein a width, in a direction of movement of the first and second conveyors, of the contact surface corresponds to a width, in the direction of movement of the first and second conveyors, of the predetermined quantity of objects.

3. The apparatus for grouping objects as set forth in claim 1, wherein a speed of the first conveyor is at least as great as a speed of the second conveyor.

4. The apparatus for grouping objects as set forth in claim 1, wherein the pusher means includes two contact surfaces, the two contact surfaces being disposed on opposite sides of the first and second conveyors.

5. The apparatus for grouping objects as set forth in claim 4, further comprising means for sequentially moving the two contact surfaces, the sequential moving means first moving a first contact surface and then moving a second contact surface, the sequential moving means subsequently holding the first and second contact surfaces in a position of rest.

6. The apparatus for grouping objects as set forth in claim 5, wherein objects are grouped in three rows when the sequential moving means sequentially moves the first and second contact surfaces and then holds the first and second contact surfaces in the position of rest.

7. The apparatus for grouping objects as set forth in claim 1, wherein the pusher means includes means for moving the contact surface including a pair of shafts connected to a portion of the contact surface at a corresponding pair of points.

8. The apparatus for grouping objects as set forth in claim 7, wherein the moving means includes a connector plate mechanically interconnecting the pair of shafts.

9. The apparatus for grouping objects as set forth in claim 1, further comprising brake means for retaining and releasing objects conveyed on the first conveyor in predetermined quantities.

10. The apparatus for grouping objects as set forth in claim 1, wherein the brake means includes a pair of belts arranged on opposite sides of the first conveyor.

11. An apparatus for grouping objects, comprising:
conveyor means, including a conveyor surface defining a plane, for moving objects on the conveyor surface in a first direction at a first speed; and
means for pushing selected objects in a second direction on the conveyor surface, the second direction being substantially transverse to the first direction and parallel to the conveyor surface plane, the pushing means including a contact surface and means for moving the contact surface through a movement pattern such that multiple streams of objects are formed on the conveyor surface, the contact surface moving, in an active portion of the movement pattern, in the second direction and in the first direction at the same time and in a plane parallel to the conveyor surface plane, the contact surface being adapted, when the contact surface is moved through the active portion of the movement pattern, to contact one or more objects to be grouped, to move the objects in the second direction, and to move with the objects in the first direction so that movement of the objects in the first direction is unimpeded by the contact surface,
wherein the contact surface moves elliptically parallel to the conveyor surface through all of the movement pattern.

12. The apparatus as set forth in claim 11, wherein a length of the contact surface in the first direction is sufficient to contact objects being grouped over substantially an entire width, in the first direction, of the objects.

13. The apparatus as set forth in claim 11, wherein a portion of the contact surface intended to contact an object moves in the first direction at the first speed through the entire active portion of the movement pattern.

14. The apparatus as set forth in claim 11, further comprising second means for pushing objects in a third direction, the third direction being substantially transverse to the first direction, parallel to the conveyor surface plane, and substantially opposite to the second direction, the second pushing means including a second contact surface and second means for moving the second contact surface through a second movement pattern, the second contact surface moving, in an active portion of the second movement pattern, in the third direction and in the first direction at the same time and in a plane parallel to the conveyor surface plane, the second contact surface being adapted, when the second contact surface is moved through the active portion of the second movement pattern, to contact one or more objects to be grouped, to move the objects in the third direction, and to move with the objects in the first direction, the second contact surface moving elliptically relative to the conveyor surface plane.

15. The apparatus as set forth in claim 14, further comprising means for sequentially moving the first and second contact surfaces, the sequential moving means first moving the first contact surface through the active portion of the first movement pattern, subsequently moving the second contact surface through the active portion of the second movement pattern, and subsequently maintaining the first and second contact surfaces in inactive potions of the first and second movement patterns, respectively.

16. The apparatus as set forth in claim 11, further comprising a second conveyor means for conveying objects to be grouped to the first conveyor means, the second conveyor means conveying objects at a second speed, and brake means for retaining objects conveyed by the second conveyor means and releasing the retained objects onto the first conveyor means in predetermined quantities of one or more.

17. The apparatus as set forth in claim 16, wherein the second speed is at least as great as the first speed.

18. The apparatus as set forth in claim 11, wherein the moving means includes first and second arms rotatably secured, at first ends thereof, to first and second points, respectively, second ends of the first and second arms being secured to the contact surface, and means for rotating the second ends of the first and second arms about the first and second points, respectively, the contact surface being moved in the second direction and in the first direction during at least a portion of the rotation of the second ends of the first and second arms about the first and second points, respectively.

19. The apparatus for grouping objects as set forth in claim 1, wherein the pusher means moves the objects transversely from the first conveyor to the second conveyor.

20. An apparatus for grouping objects, comprising:
conveyor means for receiving a stream of objects and for conveying the objects in a first direction; and
two orbitally movable parallel surfaces for shifting selected objects of the stream of objects on the conveyor means to form multiple streams of objects on the conveyor means, the surfaces being movable above a surface of the conveyor means, the surfaces each being movable relative to two vertical axis pivots, the pivots being spaced relative to each other in the first direction.

21. The apparatus as set forth in claim 20, further comprising brake means for retaining and releasing objects conveyed on the conveyor means in predetermined quantities.

22. The apparatus as set forth in claim 20, further comprising means for sequentially moving the surfaces, the sequential moving means first moving a first one of the surfaces and then moving a second one of the surfaces, the sequential moving means subsequently holding the first and second surfaces in a position of rest.

23. The apparatus for grouping objects as set forth in claim 22, wherein objects are grouped in three rows when the sequential moving means sequentially moves the first and second surfaces and then holds the first and second surfaces in the position of rest.

* * * * *